United States Patent [19]

Capra

[11] 4,196,486
[45] Apr. 8, 1980

[54] CONTROL SYSTEM FOR HORIZONTAL VEHICLE-SCRUBBING BRUSH

[75] Inventor: Uberto Capra, Alte Ceccato, Italy

[73] Assignee: Ceccato & C. S.p.A., Alte Ceccato, Italy

[21] Appl. No.: 17,033

[22] Filed: Mar. 2, 1979

[30] Foreign Application Priority Data

Mar. 3, 1978 [IT] Italy .............................. 21038B/78[U]

[51] Int. Cl.² .............................................. B60S 3/06
[52] U.S. Cl. ................................... 15/53 A; 15/DIG. 2
[58] Field of Search ........... 15/53 A, 53 AB, DIG. 2, 15/97 B

[56] References Cited

U.S. PATENT DOCUMENTS

| 3,593,358 | 7/1971 | Hofmann | 15/53 AB |
| 3,594,843 | 7/1971 | Sesia et al. | 15/53 A |
| 3,688,329 | 9/1972 | Capra | 15/53 A |
| 3,725,967 | 4/1973 | Capra | 15/53 A |

*Primary Examiner*—Edward L. Roberts
*Attorney, Agent, or Firm*—Karl F. Ross

[57] ABSTRACT

A horizontal scrubbing brush for a vehicle-washing apparatus, vertically guided in lateral tracks on a portal frame, is suspended from two sets of cables, one set leading to a counterweight, the other being linked with a piston of a single-acting pneumatic cylinder which is pressurized to raise the brush and is cut off to let the brush descend under its own weight partly balanced by the counterweight. The piston head within the cylinder is provided with resilient peripheral lips which let the air escape slowly during the descent of the brush and also exert a braking action during its ascent.

5 Claims, 2 Drawing Figures

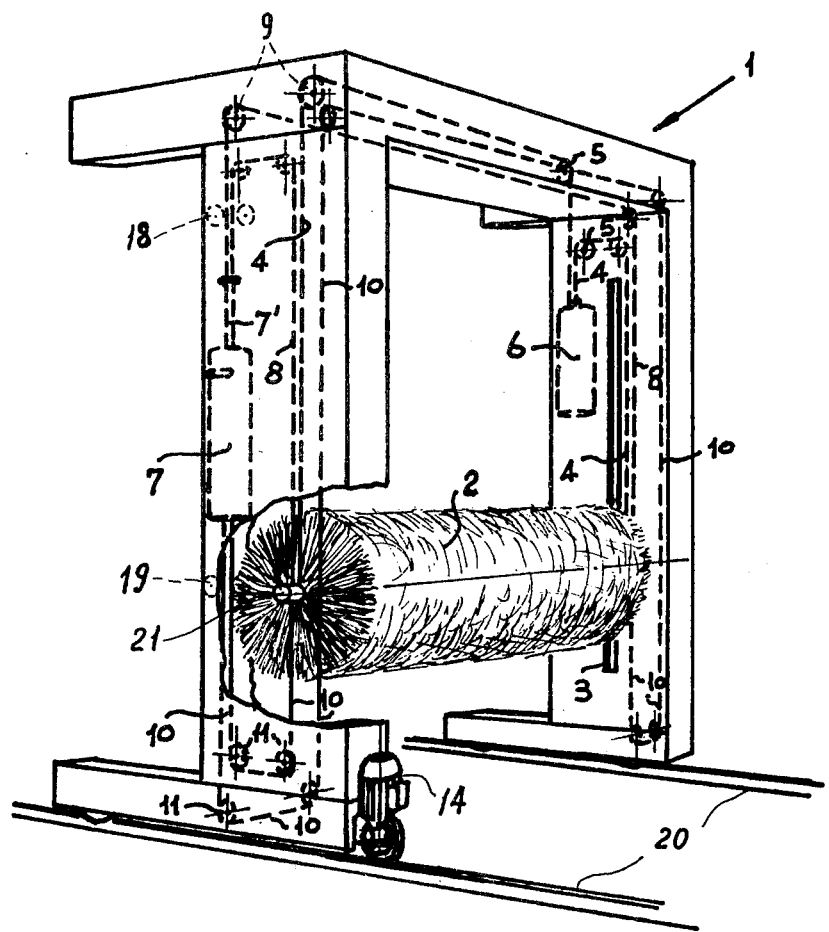
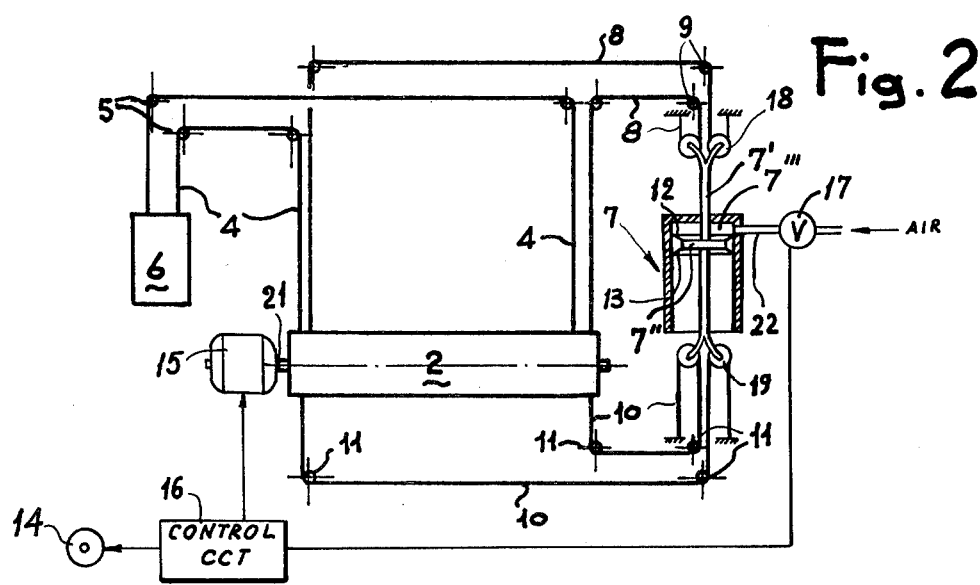

CONTROL SYSTEM FOR HORIZONTAL VEHICLE-SCRUBBING BRUSH

FIELD OF THE INVENTION

My present invention relates to a mechanism for the control of a rotary horizontal brush as used in a vehicle-cleaning station.

BACKGROUND OF THE INVENTION

In my prior U.S. Pat. No. 3,725,967 I have disclosed a mechanism of this type, used in an apparatus for washing automotive vehicles or the like, in which a cylindrical brush with a horizontal shaft is suspended within a portal frame by cables carrying counterweights partly balancing the weight of the brush and allowing it to settle by gravity on a hood, top or trunk of a vehicle and to creep up a sloping front or rear surface thereof by virtue of its own rotation even as it cleanses that surface. The system of this prior patent includes separate electric motors for relatively displacing the portal frame and the vehicle to be washed, for rotating the horizontal brush, and for hoisting that brush through a slipping clutch coupled with its cable linkage whenever this becomes necessary to clear an obstacle. An electric hoist motor may also be used, as described in my prior U.S. Pat. No. 3,688,329, to elevate such a brush rotating in a sense opposing an upward climb.

Experience has shown that a scrubbing brush descending by gravity, even with its own weight partly compensated by a counterweight, may sometimes strike a vehicular surface with too much force. Conversely, the response of an electric hoist motor to a switch sensitive to the encounter of a steeply inclined surface —as described in my prior U.S. Pat. No. 3,725,967 —may result in such a fast ascent of the brush that the surface in contact therewith is insufficiently scrubbed, particularly when the brush is corotating to promote the aforedescribed upward creep in the unoperated state of the hoist motor.

OBJECT OF THE INVENTION

The object of my present invention, accordingly, is to provide an improved control mechanism for a rotary horizontal scrubbing brush which obviates the drawbacks referred to.

SUMMARY OF THE INVENTION

A scrubbing brush controlled by a mechanism according to my present invention, supported by counterweighted suspension means on a portal frame straddling the path of a vehicle movable relatively thereto, is linked with a pneumatic hoist operable to raise the brush along a pair of vertical tracks at opposite sides of the frame. The hoist includes a piston in a single-acting cylinder whose piston head is provided with brake means enabling, in the deactivated state of the hoist, a controlled descent of the brush under its own weight as well as an upward creep on a sloping vehicular surface in contact with the brush. The hoist can be selectively activated, manually or in response to a sensing switch of the type described in either of my two above-identified prior patents, by the admission of air under pressure into the cylinder through an inlet thereof. when that inlet is closed by a valve, the air trapped in the cylinder leaks out slowly through the brake means associated with the piston head, thereby creating a dashpot effect preventing excessive acceleration.

According to a more particular feature of my invention, the brake means in the single-acting cylinder comprises a resilient packing which surrounds the piston head and bears upon the inner cylinder wall, thereby generating a frictional resistance effective in both directions of displacement.

BRIEF DESCRIPTION OF THE DRAWING

The above and other features of my invention will now be described in detail with reference to the accompanying drawing in which:

FIG. 1 is a perspective view (parts broken away) of a portal frame in a vehicle-washing station equipped with a horizontal scrubbing brush under the control of a mechanism according to my invention; and FIG. 2 is a diagrammatic representation of that control mechanism.

SPECIFIC DESCRIPTION

In FIG. 1 I have shown a portal frame 1 riding on a pair of rails 20 along which it can be driven by a reversible electric motor 14. A horizontal scrubbing brush 2 has a shaft 21 with extremities guided in two vertical tracks 3 on the inner jamb surfaces of frame 1.

Brush 2 is suspended by a set of cables 4 anchored to its shaft 21 (in a manner not illustrated in detail) and guided around rollers 5 at the lintel of frame 1. These cables terminate at one or more counterweights 6 (only one shown) which do not completely balance the weight of the brush 2 so that the latter tends to descend by gravity to the bottom of the frame.

Another set of cables 8, also anchored to the shaft 21 of brush 2, pass around deflecting rollers 9 on the frame lintel as well as around vertically movable pulleys 18 which are linked to a rod 7' of a piston forming part of a pneumatic jack with a single-acting cylinder 7. A piston head 7" (see FIG. 2) defines within cylinder 7 a variable air space 7''' with an inlet 22 which is connected via a shutoff valve 17 to a nonillustrated air compressor. The opposite end of piston rod 7' is linked with another pair of vertically movable pulleys 19 embraced by a further set of cables 10 which pass around deflecting rollers 11 near the bottom of portal frame 1 and are also anchored to the brush shaft 21; thus, cables 8 and 10 form a closed loop including the piston 7', 7" as well as the two pulley blocks 18 and 19 acting as motion amplifiers so as to translate the stroke of the piston into a magnified displacement of the brush 2.

As further shown in FIG. 2, piston head 7" is surrounded by two annular lips 12 and 13 of rubber or other resilient material bearing upon the inner cylinder surface at axially spaced locations. Thus, upon the opening of valve 17, air under pressure enters the compartment 7''' and drives the piston downwardly against the frictional resistance of the lower lip 13 which controls the speed of ascent of the brush. When the valve 17 is closed to cut off the inlet 22, the weight of the brush drives the piston upwardly as the compressed air slowly escapes from compartment 7''' around annular packing 12, 13 whose upper lip 12 exerts a braking action further retarding the descent of the brush.

Drive motor 14, valve 17 and another reversible motor 15 serving to rotate the brush 2 are selectively operable, manually or by means of a timer, via a control circuit 16 which may also include a sensing switch of the type described in either of my above-identified prior patents for the actuation of the hoist, 7, 7', 7" by means of valve 17 whenever the brush 2 encounters an obstacle or a steep vehicular surface; such a switch may also arrest or decelerate the drive motor 14 until the obstacle has been cleared. Thus, the tracks 3 need not be fixed to the jambs of frame 1, as shown, but could be formed on a swingable brush support triggering the sensing switch in conformity with U.S. Pat. No. 3,688,329.

I claim:

1. In a vehicle-cleaning station, in combination:
   a portal frame straddling the path of a vehicle to be scrubbed, said frame and said vehicle being relatively movable along said path;
   a pair of vertical tracks at opposite sides of said frame;
   a generally cylindrical scrubbing brush having a horizontal shaft with ends respectively guided by said tracks for vertical reciprocation;
   counterweighted suspension means on said frame engaging said brush and partly balancing the weight thereof;
   pneumatic hoist means linked with said brush and operable to raise same along said tracks, said hoist means including a piston in a single-acting cylinder and actuating means for the selective admission of air under pressure into said cylinder through an inlet thereof for elevating said brush, said piston having a piston head provided with brake means enabling a controlled descent of said brush under its own weight upon deactivation of said hoist means by a closure of said inlet; and
   drive means coupled with said shaft for rotating said brush about its axis in a sense causing same to creep up a sloping vehicular surface in contact therewith, in the deactivated state of said hoist means, against a retarding action by said brake means.

2. The combination defined in claim 1 wherein said brake means comprises a resilient packing surrounding said piston head and bearing upon the inner wall of said cylinder.

3. The combination defined in claim 2 wherein said packing comprises a pair of lips spaced apart in the direction of the cylinder axis.

4. The combination defined in claim 1, 2 or 3 wherein said piston is linked with said brush through a set of cables guided on said frame in a closed loop.

5. The combination defined in claim 4 wherein said loop includes a pulley block translating the stroke of said piston into a magnified displacement of said brush.

* * * * *